(12) United States Patent
Mendes

(10) Patent No.: US 7,086,328 B1
(45) Date of Patent: Aug. 8, 2006

(54) FILTERING DEVICE FOR A CITRUS JUICE EXTRACTION MACHINE

(76) Inventor: Carlos Neto Mendes, 1738 Rua Voluntarios, Araraquara, Sao Paulo (BR)

(*) Notice: Subject to any disclaimer, the term of this patent is extended or adjusted under 35 U.S.C. 154(b) by 0 days.

(21) Appl. No.: 09/028,187

(22) Filed: Feb. 23, 1998

Related U.S. Application Data

(63) Continuation-in-part of application No. 08/884,529, filed on Jun. 27, 1997, now abandoned, and a continuation-in-part of application No. 08/763,679, filed on Dec. 11, 1996, now abandoned, and a continuation-in-part of application No. 08/759,727, filed on Dec. 6, 1996, now abandoned, and a continuation-in-part of application No. 08/759,722, filed on Dec. 6, 1996, now Pat. No. 5,720,219, and a continuation-in-part of application No. 08/759,723, filed on Dec. 6, 1996, now abandoned, and a continuation-in-part of application No. 08/759,724, filed on Dec. 6, 1996, now abandoned, and a continuation-in-part of application No. 08/681,622, filed on Jul. 29, 1996, now abandoned, and a continuation-in-part of application No. 08/681,623, filed on Jul. 29, 1996, now abandoned, and a continuation-in-part of application No. 08/681,624, filed on Jul. 29, 1996, now abandoned, and a continuation-in-part of application No. 08/681,625, filed on Jul. 29, 1996, now abandoned, and a continuation-in-part of application No. 08/681,626, filed on Jul. 29, 1996, now Pat. No. 5,802,964, and a continuation-in-part of application No. 08/681,658, filed on Jul. 29, 1996, now abandoned, and a continuation-in-part of application No. 08/681,627, filed on Jul. 29, 1996, now Pat. No. 5,720,218, and a continuation-in-part of application No. 08/681,628, filed on Jul. 29, 1996, now abandoned, and a continuation-in-part of application No. 08/647,066, filed on May 9, 1996, now Pat. No. 5,655,441.

(30) Foreign Application Priority Data

| | | |
|---|---|---|
| Jun. 19, 1995 | (BR) | 9502244 |
| Aug. 1, 1995 | (BR) | 5501197 |
| Aug. 1, 1995 | (BR) | 5501198 |
| Aug. 1, 1995 | (BR) | 5501199 |
| Aug. 1, 1995 | (BR) | 7501779 U |
| Aug. 1, 1995 | (BR) | 7501780 U |
| Aug. 1, 1995 | (BR) | 7501781 U |
| Aug. 1, 1995 | (BR) | 9503518 |
| Aug. 7, 1995 | (BR) | 5501053 |
| Aug. 7, 1995 | (BR) | 7501563 U |
| Aug. 7, 1995 | (BR) | 9503109 |
| Dec. 8, 1995 | (BR) | 5501976 |
| Dec. 8, 1995 | (BR) | 7502784 U |
| Dec. 8, 1995 | (BR) | 7502785 U |
| Dec. 8, 1995 | (BR) | 7502786 U |
| Dec. 15, 1995 | (BR) | 7502994 U |

(51) Int. Cl.
*B30B 9/04* (2006.01)

(52) U.S. Cl. .................. 100/98 R; 99/495; 99/509; 100/108; 100/116; 100/130; 100/213

(58) Field of Classification Search ................ 100/43, 100/98 R, 99, 107, 108, 116, 130, 134, 135, 100/213; 99/486, 489, 493, 495, 507, 509–513
See application file for complete search history.

(56) References Cited

U.S. PATENT DOCUMENTS

| | | | | |
|---|---|---|---|---|
| 1,514,094 A | * | 11/1924 | Noble | 100/213 |
| 2,522,800 A | * | 9/1950 | Quiroz | 100/107 |
| 2,540,345 A | * | 2/1951 | Pipkin | 100/108 |
| 2,723,618 A | * | 11/1955 | Matthews | 100/130 |
| 2,748,693 A | * | 6/1956 | Drain et al. | 100/98 R |
| 3,053,170 A | * | 9/1962 | Cook | 100/98 R |
| 3,086,455 A | * | 4/1963 | Belk | 100/131 |
| 3,162,114 A | * | 12/1964 | Quiroz | 100/98 R |
| 3,269,301 A | * | 8/1966 | Krause | 100/108 |
| 3,866,528 A | * | 2/1975 | Montagroni | 99/495 |
| 4,154,163 A | * | 5/1979 | Niemann | 100/98 R |
| 4,376,409 A | * | 3/1983 | Belk | 100/98 R |
| 4,391,185 A | * | 7/1983 | Stanley | 99/495 |
| 4,700,620 A | * | 10/1987 | Cross | 100/98 R |
| 4,905,586 A | * | 3/1990 | Anderson et al. | 100/98 R |

| | | | | |
|---|---|---|---|---|
| 4,917,007 A | * | 4/1990 | Nelson | 100/98 R |
| 4,922,813 A | * | 5/1990 | Compri | 100/98 R |
| 4,922,814 A | * | 5/1990 | Anderson et al. | 100/98 R |
| 4,951,563 A | * | 8/1990 | Warren et al. | 100/213 |
| 4,961,374 A | * | 10/1990 | Lee | 100/98 R |
| 5,035,174 A | * | 7/1991 | Seal, Jr. | 100/98 R |
| 5,070,778 A | * | 12/1991 | Cross et al. | 100/98 R |
| 5,097,757 A | * | 3/1992 | Antonio | 100/98 R |
| 5,156,872 A | * | 10/1992 | Lee | 100/98 R |
| 5,170,700 A | * | 12/1992 | Anderson et al. | 100/98 R |
| 5,182,984 A | * | 2/1993 | Wagner | 100/98 R |
| 5,199,348 A | * | 4/1993 | Cimenti | 100/98 R |
| 5,249,514 A | * | 10/1993 | Otto et al. | 99/510 |
| 5,331,887 A | * | 7/1994 | Beck | 100/108 |
| 5,339,729 A | * | 8/1994 | Anderson | 100/98 R |
| 5,381,730 A | * | 1/1995 | Kim | 100/98 R |
| 5,396,836 A | * | 3/1995 | Kim | 99/495 |
| 5,483,870 A | * | 1/1996 | Anderson et al. | 100/98 R |
| 5,655,441 A | * | 8/1997 | Mendes | 100/108 |
| 5,720,218 A | * | 2/1998 | Mendes | 100/108 |
| 5,720,219 A | * | 2/1998 | Mendes | 100/108 |
| 5,802,964 A | * | 9/1998 | Mendes | 100/108 |

\* cited by examiner

*Primary Examiner*—Stephen F. Gerrity

(74) *Attorney, Agent, or Firm*—Beusse, Wolter, Sanks, Mora & Maire, P.A.

(57) ABSTRACT

A fruit juice extraction apparatus comprising: a chassis having mounted thereon a juice extractor which has a container for storing the fruit, the container having an aperture therein for allowing articles of fruit to be deposited between two concave hemispheres; drive motor for actuator for forcing the first concave hemispheres against the second concave hemispheres, thereby pressing an article of fruit deposited between said hemispheres; the first concave hemisphere having a central pin and the second concave hemisphere a perforating tube for the extraction of juice from said article of fruit, whereby the solid residue is deposited in a receptacle and the liquid is passed through a filter and then falls into a reservoir which has outlet ports therein, the perforating tube having multiple transverse slits of increasing diameter from inside to outside.

6 Claims, 12 Drawing Sheets

FILTERING DEVICE FOR A CITRUS JUICE EXTRACTION MACHINE

CROSS REFERENCE TO RELATED APPLICATIONS

This application is a continuation-in-part of U.S. patent application Ser. No. 08/884,529 filed Jun. 27, 1997 (now abandoned). U.S. patent application Ser. No. 08/884,529 is a continuation-in-part of U.S. patent application Ser. No. 08/763,679 filed Dec. 11, 1996 (now abandoned), and also is a continuation-in-part of U.S. patent application Ser. No. 08/759,727 filed Dec. 6, 1996 (now abandoned), and also is a continuation-in-part of U.S. patent application Ser. No. 08/759,722 filed Dec. 6, 1996 (now U.S. Pat. No. 5,720,219), and also is a continuation-in-part of U.S. patent application Ser. No. 08/759,723 filed Dec. 6, 1996 (now abandoned), and also is a continuation-in-part of U.S. patent application Ser. No. 08/759,724 filed Dec. 6, 1996 (now abandoned), and also is a continuation-in-part of U.S. patent application Ser. No. 08/681,622 filed Jul. 29, 1996 (now abandoned), and also is a continuation-in-part of U.S. patent application Ser. No. 08/681,623 filed Jul. 29, 1996 (now abandoned), and also is a continuation-in-part of U.S. patent application Ser. No. 08/681,624 filed Jul. 29, 1996, (now abandoned) and also is a continuation-in-part of U.S. patent application Ser. No. 08/681,625 filed Jul. 29, 1996 (now abandoned), and also is a continuation-in-part of U.S. patent application Ser. No. 08/681,626 filed Jul. 29, 1996 (now U.S. Pat. No. 5,802,964), and also is a continuation-in-part of U.S. patent application Ser. No. 08/681,658 filed Jul. 29, 1996 (now abandoned), and also is a continuation-in-part of U.S. patent application Ser. No. 08/681,627 filed Jul. 29, 1996 (now U.S. Pat. No. 5,720,218), and also application is a continuation-in-part of U.S. patent application Ser. No. 08/681,628 filed Jul. 29, 1996 (now abandoned), and also is a continuation-in-part of U.S. patent application Ser. No. 08/647,066 filed May 9, 1996 (now U.S. Pat. No. 5,655,441).

The entirety of these previous applications are incorporated herein by reference as if set forth in full below.

A descriptive report of a patent invention:

"IMPROVEMENT TO A FILTERING DEVICE FOR A CITRUS JUICE EXTRACTION MACHINE".

The patent referred to here as "IMPROVEMENT TO A FILTERING DEVICE FOR A CITRUS JUICE EXTRACTION MACHINE", as the nomenclature applies, improvements which consist of a singular mechanical device of automatic functioning, that by incorporation to the citrus juice extraction machine, increases substantially its productivity and the quality of the obtained product (juice), be it that at every cycle of operation the system passes through a total cleaning and the refuse from the fruit are expelled into a single reservoir, which facilitates the sanitation of the equipment and avoids the proliferation of bacteria.

For such, one of the details of the device refers to a perforating tube (described in process "PI 9502244-9" of Jun. 19, 1995, and which is repeated herein below), which was incorporated into a high efficiency filtering system, since it is self cleaning.

It is worth noting that there does not exist any electro-mechanical device for the driving of the said assembly, which consists basically of the perforating filter and a piston concentric to same, which promotes the internal scraping of the filter in order to clean it.

Such device is totally unknown by the state of the technology and its installation guarantees a relevant increase in the productivity of the assembly.

To better elucidate the model, references will be made to the following included drawings, where:

FIG. 4 shows a side view of the machine, displaying details of the device.

FIG. 5 illustrates a plan view of the device installed on the machine.

FIG. 6 illustrates the perforating filter.

The invention referred to herein as "CONFIGURATION OF A FRUIT JUICE EXTRACTION MACHINE" or fruit juice extraction apparatus is, as is alluded to in the name itself, a machine developed for the production of citrus fruit juices, such as: lemon, orange, tangerine, ponkan, etc., providing greater practical and sanitary conditions, with the advantage of totally eliminating manual contact during the extraction of the juice from the fruit.

DESCRIPTION OF THE PRIOR ART

The apparatus of the present invention consists of an automatic system where synchronized and concentric elements press the orange (this fruit will be used only as an example), without crushing the peel, by this avoiding the dispersion of acids (from the peel), favoring the retention of totally natural juice.

Particularly in the case of commercial establishments, we know that in these localities orange juice is extracted by use of electrical rotary squeezers that are noisy and non-sanitary; and such squeezers are of low production and generate excessive physical fatigue on the part of the operator, since he has to cut hundreds of oranges in half every day, processing each and every orange half in the squeezer. It is not difficult to notice that this process is non-sanitary, since manual contact is indispensable.

These factors make the instantaneous production of natural juice not viable, since the slow rates of production make for an expensive final product, plus the fact that consumers will tend to opt for processed drinks given the lack of sanitary conditions in the extraction of natural juices. It is also important to observe the existence of manual squeezers, that incorporate all of the previously mentioned negative features, and are totally not viable for production of juice on a commercial scale.

Equipment that crush all of the fruit in the extraction of juice have an elementary disadvantage that is the dispersion of the acids in the peel, leaving the juice with a bitter taste, not fit for consumption.

It is worth noting that to resolve these problems, several types of machinery and equipment for the extraction of juice have appeared, incorporating important shortcomings that are important to be analyzed, such as:

currently it is known of a machine for processing citrus fruit, especially oranges, where there is a system which after the insertion of the fruit, it is cut in half, and the halves are separated in two rotating cylinders in which two geared reamers, also rotating and hemispherical in shape, crush the fruit halves extracting the juice.

Nevertheless, this system, because of its characteristics, exposes the extracted juice to the peel, in such a manner that the juice bathes, partially or totally, the peel, provoking an emulsification of the oil contained in the peel, incorporating it in the juice, making it acidic and bitter.

It is worth noting that in laboratory tests, it is observed that the level of peel oil in the juice, with this system, varies from 50 to 500% above the norm tolerable for consumption.

There are also other known equipment that function in distinctly different manners than the one previously cited, encompassing voluminous and heavy mechanical systems that provoke the crushing of the whole fruit.

To have a more complete idea of these machines, they are so heavy that they require the use of hoists or cranes for maneuvering.

The existing mechanical systems consist of actuated arms that compress the fruit between two concentric peelers. Said concentric peelers are built with multiple radial openings that interlink with each other (one cupping the other). Nevertheless, the design of the openings makes it such that the fruit becomes crushed and not cut, resulting in the liberation of peel oil into the juice.

As a result of the large space occupied by the machines, the space for fruit storage becomes very limited, forcing the operator to feed the machine constantly.

Systems taught in FMC Corporation's U.S. Pat. No. 5,070,778, No. 5,170,700, No. 5,339,729 and, No. 5,483,870, produce oil in the juice and the vertical cores have a tendency to jam with the fruit.

In analyzing these inconveniences, the applicant, who is active in this segment of the market, has developed the apparatus herein claimed, as a definitive solution to these inconveniences.

The apparatus of the present invention is notably more compact and as a consequence lighter. This is due to the utilization of simplified mechanisms with greater functional efficacy.

These mechanisms make possible the easy cleaning of the equipment and less maintenance, noting also that the noise level is slightly lower.

In its fundamental scope, the apparatus fact presented herein functions in the following manner:

on the upper part of a tray which holds several fruit which, by force of gravity, fall one by one between two concave and radially cut hemispheres, one of those moves axially being actuated by a rod connected to a type of crankshaft arm.

The system does not crush the peel and does shear it in multiple slivers, at the same time it compresses the fruit, a factor that impedes the release of the oil in the peel. It is worth noting that this peel, after the extraction of the juice, falls totally dry into an appropriate reservoir.

Unequivocally, it can be concluded that the cost/benefit relationship of the present invention is greater than that of those known to date, because of its compact nature and high quality juice produced, similar to a home made juice.

Because of these advantages and others that will easily be noticed by the user, as well as its uniqueness in relation to the state of the technology, the applicant, therefore, submits this machine has the requisites for achieving patent approval.

SUMMARY OF THE INVENTION

The apparatus of the present invention for processing citrus fruit in general, without manual contact, comprises a tubular chassis fixed to an extraction box being on it affixed a gearmotor actuating an crank and rod assembly which dislocates one concave hemisphere against another concave hemisphere pressing the fruit released by a trigger situated on an opening in a tray in which one of the concave hemispheres has a central pin and on the other a perforating tube for the extraction of the juice, the solid residues being released into a receptacle and the liquid being passed through a filter and then falling into a reservoir which has faucets or outlets.

DETAILED DESCRIPTION OF THE PREFERRED EMBODIMENT

Figure 1:
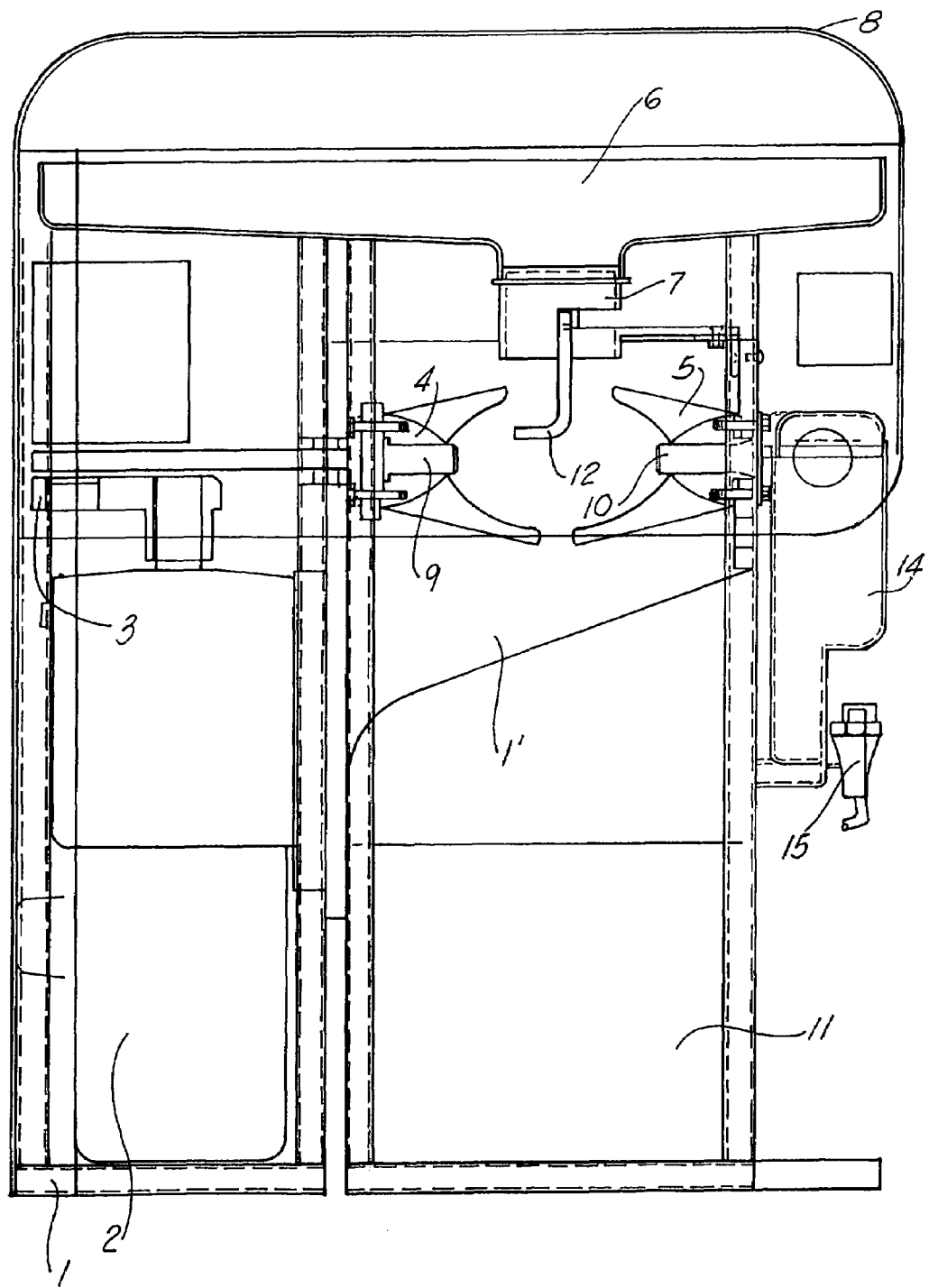
FIG. 1 is a side elevational view, partially in cross-section, of the preferred embodiment of the apparatus of the present invention.
Figure 2:
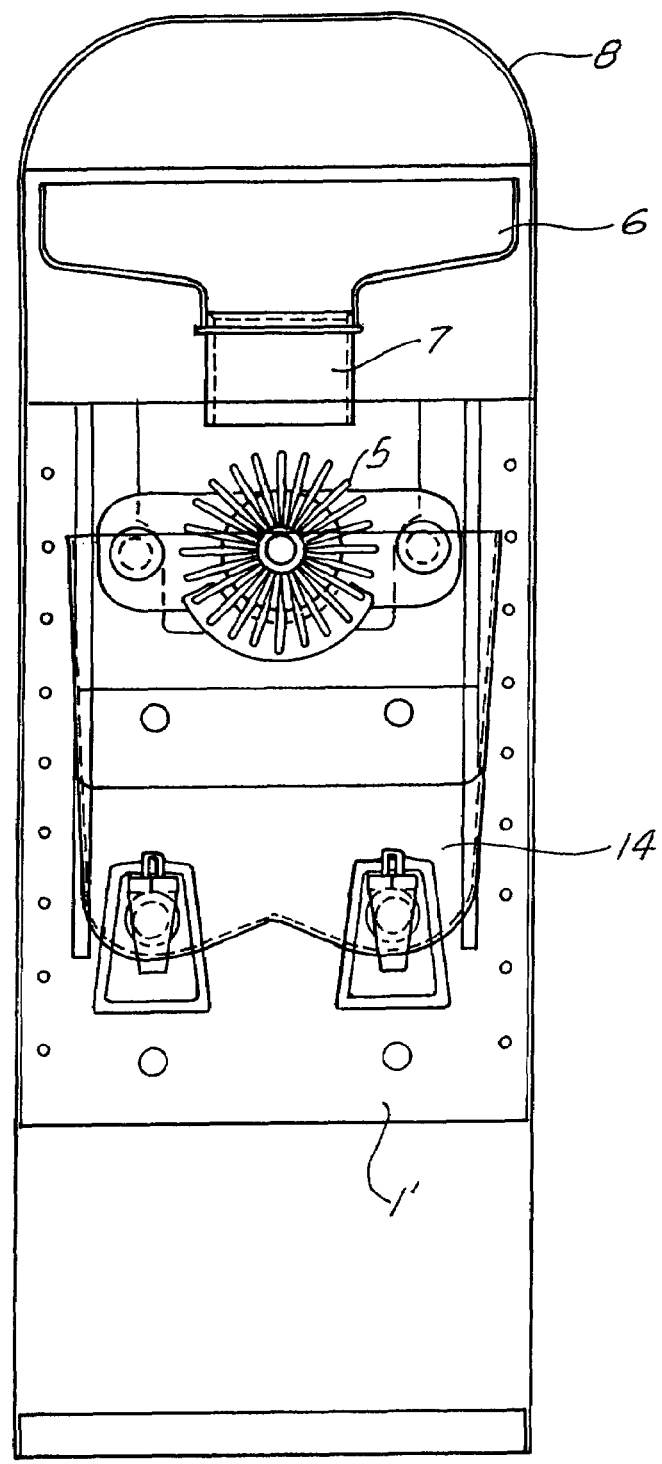
FIG. 2 is front elevational view, partially in cross-section, of the embodiment of FIG. 1.
Figure 3:
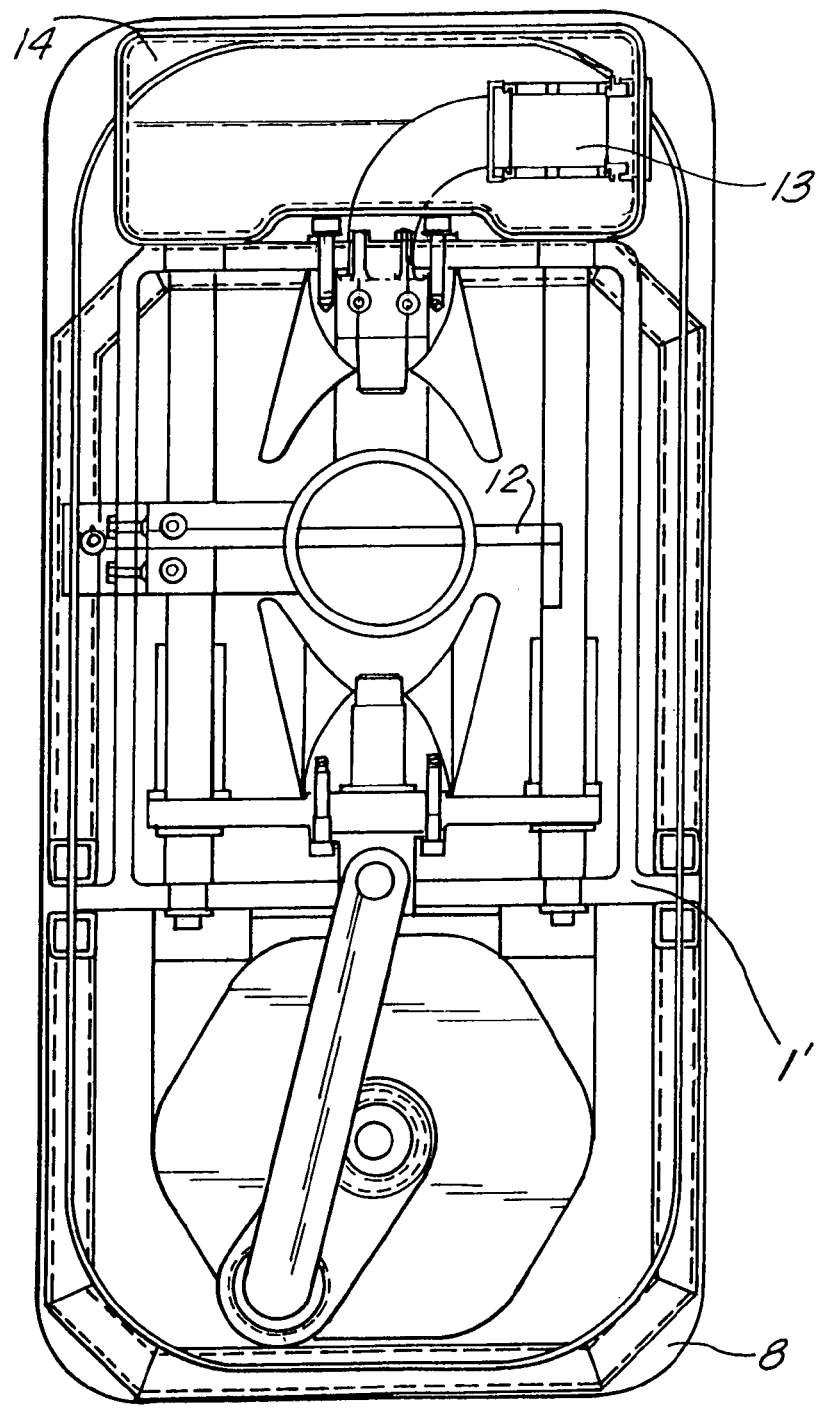
FIG. 3 is a top plan view, partially in cross-section, of the embodiment of FIG. 1.
Figure 4:
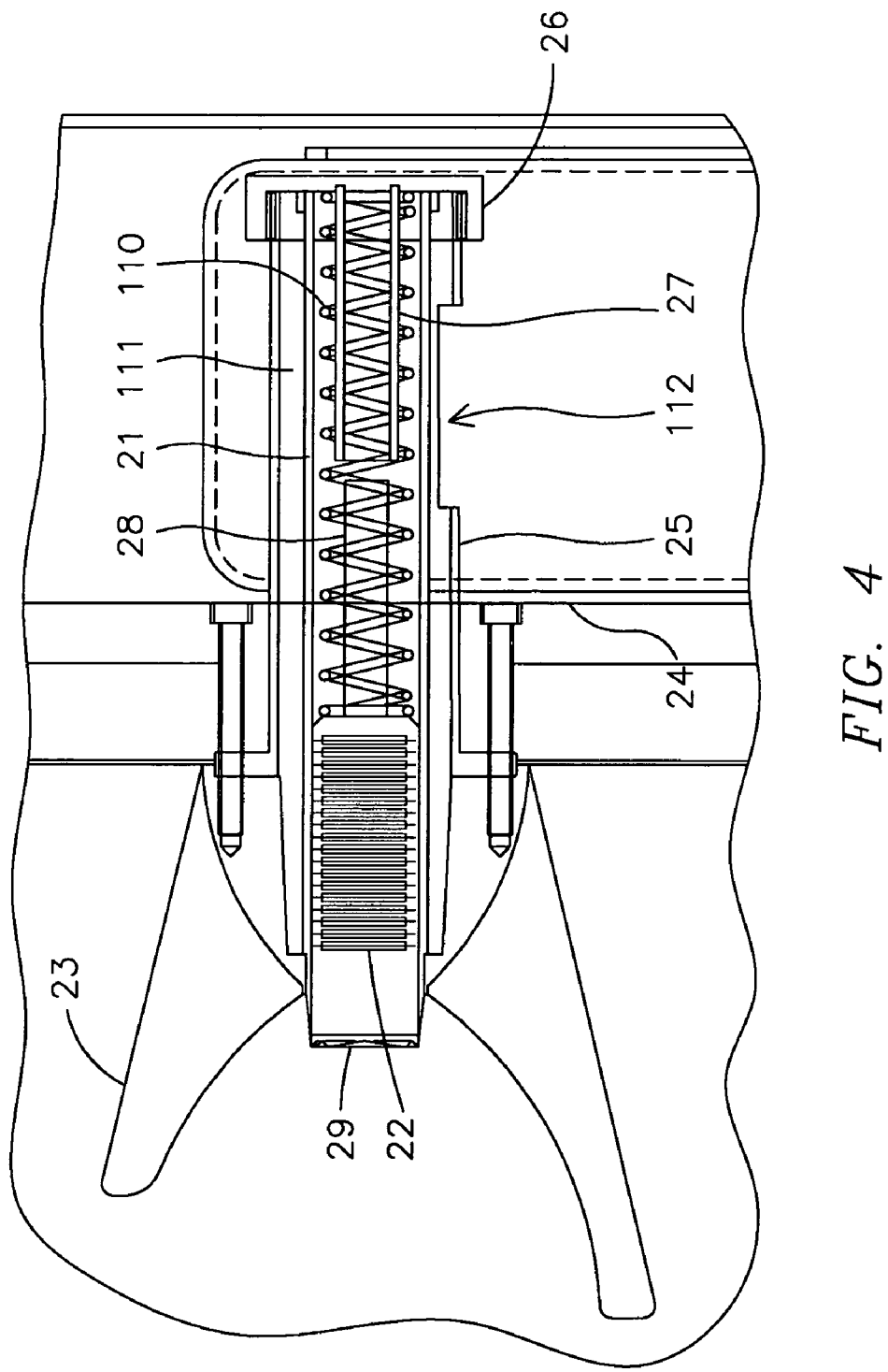
FIG. 4 shows a partial side view of the machine, partially in cross-section, displaying details of the device.
Figure 5:
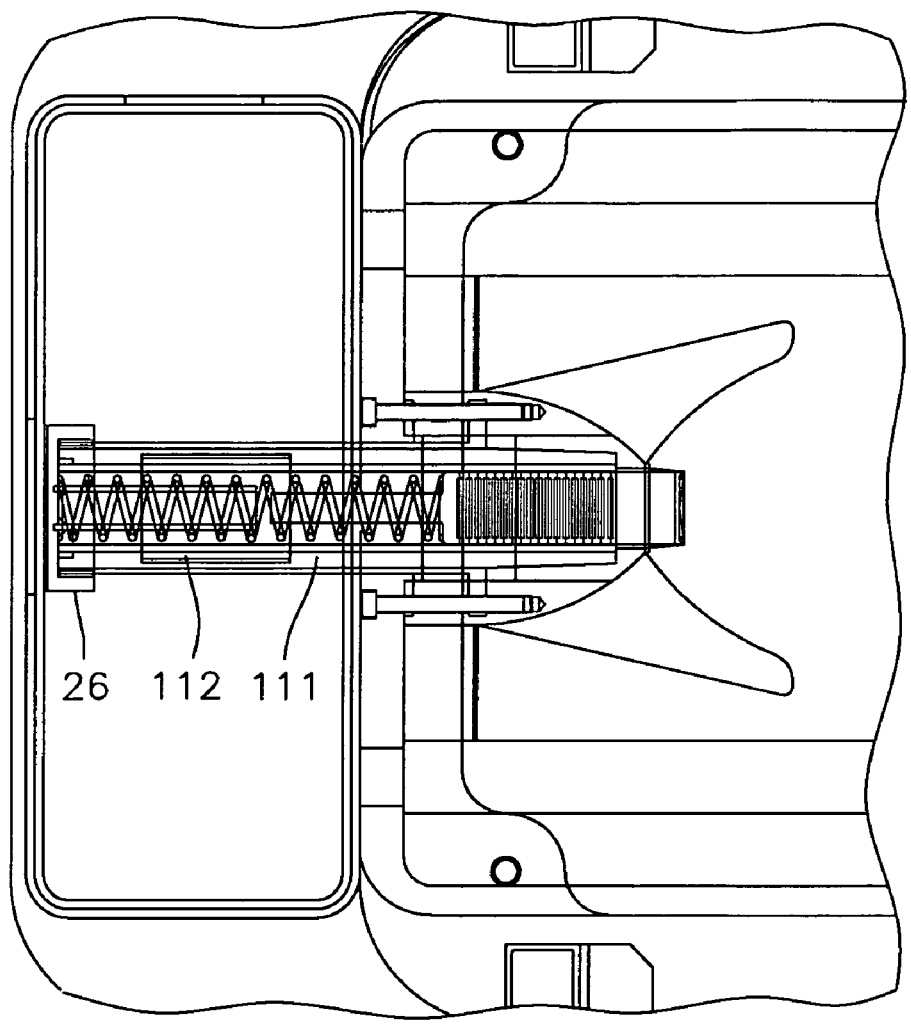
FIG. 5 illustrates a plan view of the device installed on the machine.
Figure 6:
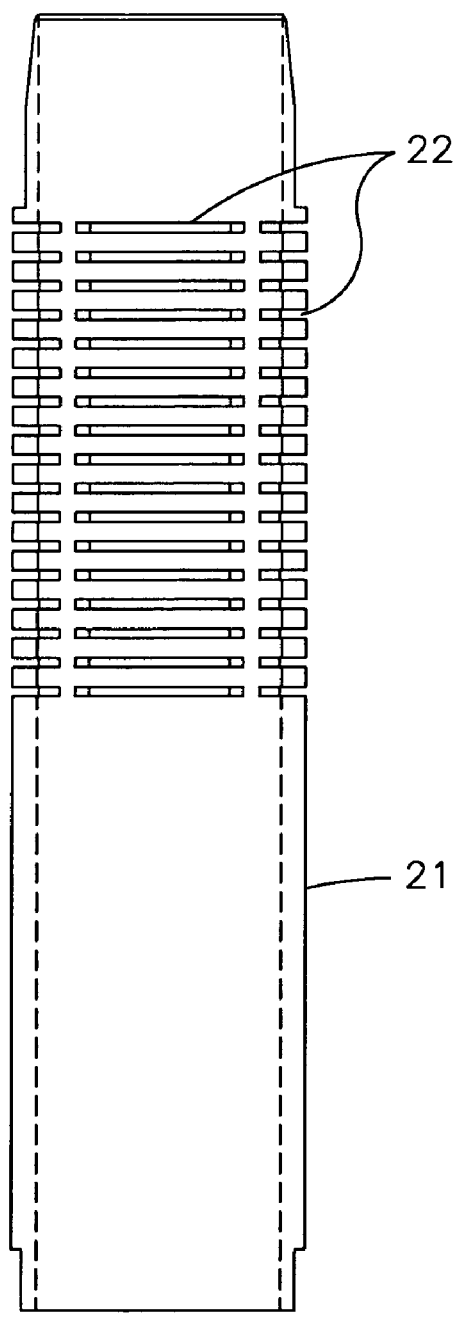
FIG. 6 illustrates the perforating filter.

CONFIGURATION OF A FRUIT JUICE EXTRACTION MACHINE or the fruit juice extracting apparatus of the present invention, in accordance with FIGS. 1–3, comprises a tubular chassis 1, affixed to an extraction box 1' for housing juice, mounted vertically on this box 1' is a gearmotor 2 which drives a crank and rod 3 which provokes the axial movement of one of the concave and radially cut hemispheres 4 against the other concave and radially cut hemisphere 5, both radially interfacing.

On the upper part of the apparatus is provided a tray 6 with an opening 7 through which the fruit is driven to fall in between the concave hemispheres 4, 5, all shielded by a protective cover 8 over the entire assembly.

The concave hemisphere 4 has a concentric central pin 9 and the concave hemisphere 5 has a perforating tube 10 through which the juice is extracted. The fruit peel and core fall into receptacle 11.

The concave hemisphere 4 drives a trigger 12 during its motion feeding one fruit at a time; the juice coming from the tube 10 passes through a filter 13 and is retained in a reservoir 14 which is equipped with faucets or outlet ports 15 for dispensing.

Incidental residues, such as core and seeds do not pass through the filter 13 and are ejected through the tube 10 toward the receptacle 11.

"IMPROVEMENT TO A FILTERING DEVICE FOR A CITRUS JUICE EXTRACTION MACHINE", constitute by an automatic system, composed by an extended perforating tube (21) having multiple transverse slits (22) of increasing diameter from inside to outside, being said tube (21) concentrically affixed to the fixed peeler (23), mounted with bolts to the side wall of the machine (24) jointly with the flange of the tubular juice collector (25), which projects itself outwardly from the machine.

Said juice collector (25) has a threaded cover (26), concentrically to which engages the perforating tube (21), being on said cover (26) built-in a tubular extension (27) on which slides a rod (28) connected to the piston (29) which works inside the tube (21), being that the cutting extremity projects itself out of this tube in order to expel the refuse for the pressing of the fruit, since during the pressing the piston is impelled inwardly to the tube (21) and in this manner offers a counter pressure on the flow of extraction, due to the action of a helical compression spring (110).

The juice is filtered by the slits (22) which by its configuration is self cleaning, passing through a chamber (11) formed by the juice collector (25) and the peeler (23). The juice is totally filtered, then exiting through a window (112) on the juice collector, directly to the interior of a dedicated reservoir.

The refuse materials are collected by a central reservoir; being observable that this system, allied to the use on stainless steel materials, guarantees the maintenance of the organoleptic characteristics of the extracted juice.

SUMMARY

Patent of a model of utility "IMPROVEMENT TO A FILTERING DEVICE FOR A CITRUS JUICE EXTRACTION MACHINE", composed of improvements introduced to the filtering system of the machine of the claimant consisting of a perforating tube (21) having multiple transverse slits (22) of increasing diameter from inside to outside, concentric to the peeler (23), and the tubular juice collector (25), that has a window opening (112) and a threaded cover (26), which centers the tube (21), being built-in a tubular extension (27) on which slides a rod (28) connected to the piston (29) pushed by the spring (110) being that the cutting extremity of the piston extends outward of the tube (21); a chamber (111) collects the juice filtered through the slits (22).

A descriptive report of a patent invention of:

A FILTERING DEVICE FOR A CITRUS JUICE EXTRACTION MACHINE

The patent referred to here as, "A FILTERING DEVICE FOR A CITRUS JUICE EXTRACTION MACHINE", as the title implies, improvements to the object described in process "PI 9502244-9" of Jun. 19, 1995, of the same claimant, and which is repeated herein above, improvements which consist of singular mechanical device that functions automatically, that once incorporated into the machine, increases substantially its productivity and the quality of the obtained product (juice), be it that at every cycle of operation the systems passes through a total cleaning and the refuse from the fruit are expelled into a single reservoir, which facilitates the sanitation of the equipment and avoids proliferation of bacteria.

For such, one of the details of the device refers to a perforating tube (already described in another descriptive report), which was incorporated into high efficiency filtering system, since it is self cleaning.

It is worth noting that there does not exist any electro-mechanical device for the driving of the said assembly, which consists basically of the perforating filter and a piston concentric to same, which promotes the internal scraping of the filtering in order to clean it.

Such device is totally unknown by the state of the technology and its installation guarantees a relevant increase in the productivity of the assembly.

Figure 7:
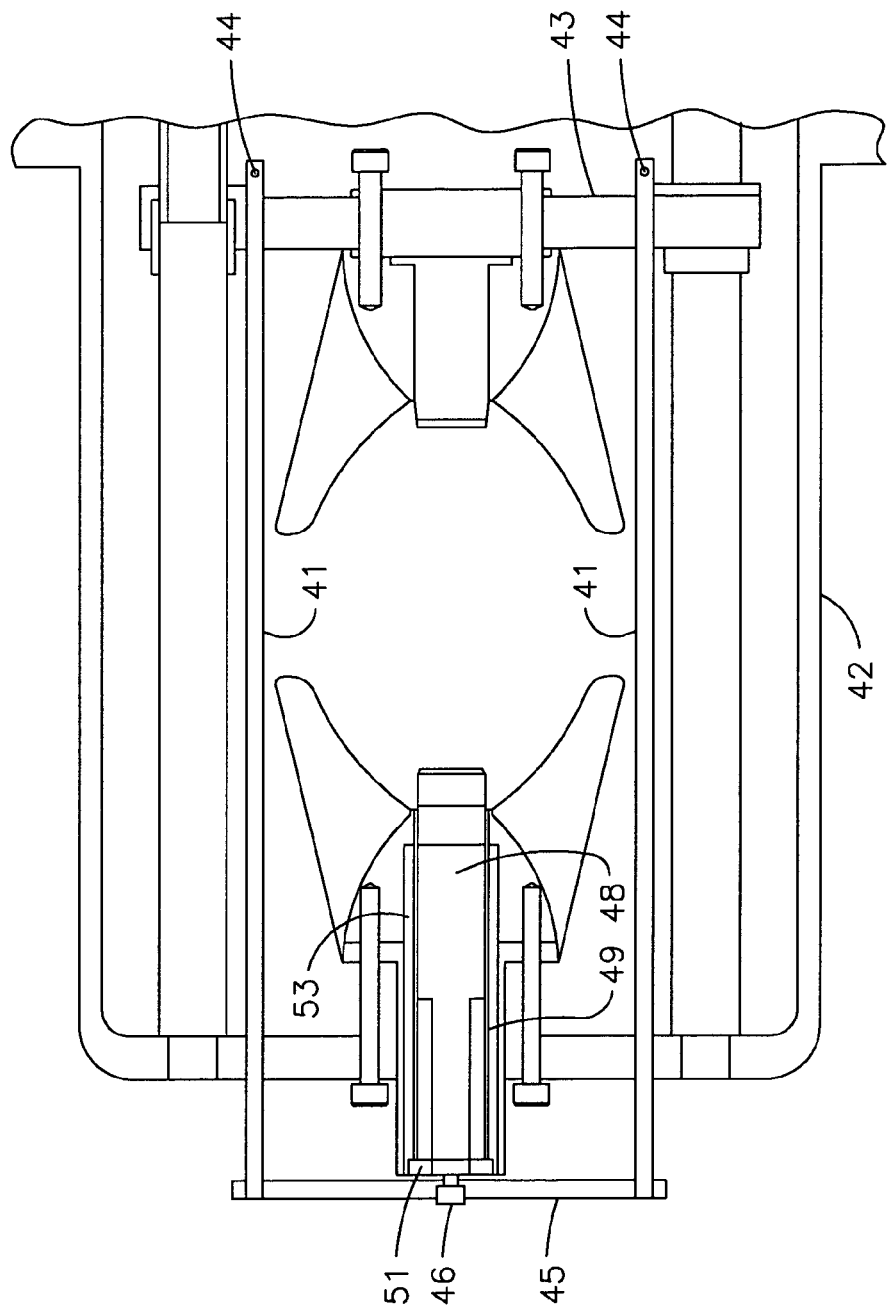
FIG. 7 illustrates the top view detailing the device in question together with the cutting, pressing and juice extraction mechanism.

To better elucidate the model, references will be made to the following included drawings, where:

FIG. 7 illustrates the top view detailing the device in question together with the cutting, pressing and juice extraction mechanism.

Figure 8:
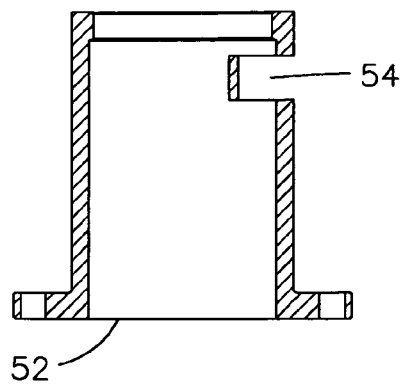
FIGS. 8 and 8A illustrate a cross-sectional side view and top view of the juice collector.

FIG. 8 illustrates a cross-sectional side view of the juice collector.

Figure 8A:
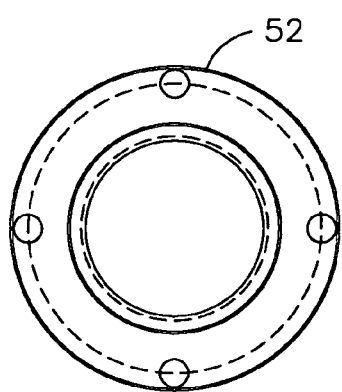

FIG. 8a is a top plan view of the juice collector of FIG. 8.

Figure 9:
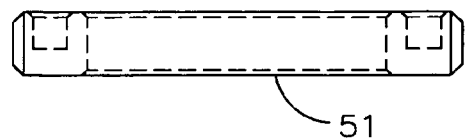
FIGS. 9 and 9A illustrate on a larger scale the support of the perforating filter.
Figure 9A:
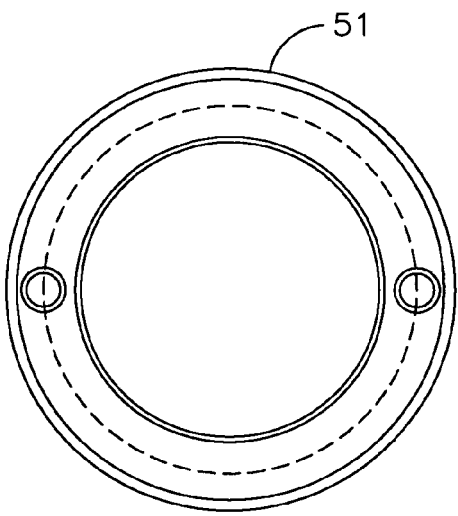

FIGS. 9 and 9a illustrate a cross-sectional side and top plan view, respectively, on a larger scale the support of the perforating filter.

Figure 10:
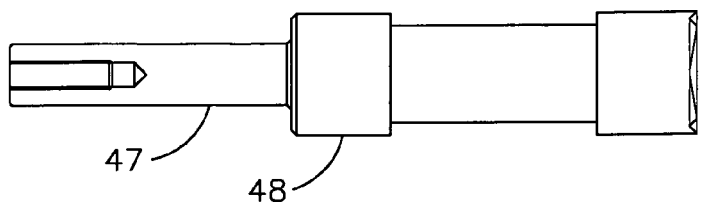
FIGS. 10 and 10A illustrate the perforating tube's piston.
Figure 10A:
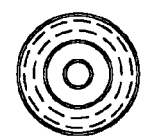

FIGS. 10 and 10a illustrate a side elevational and top plan view, respectively, the perforating tube's piston.

Figure 11:
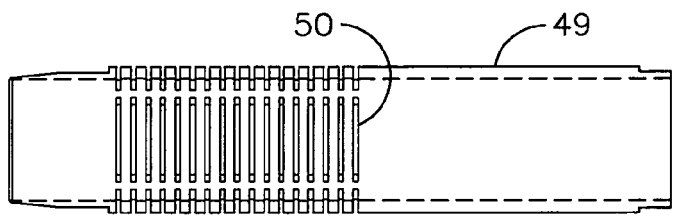
FIGS. 11 and 11A illustrate the cross-section of the perforating filtering tube.
Figure 11A:
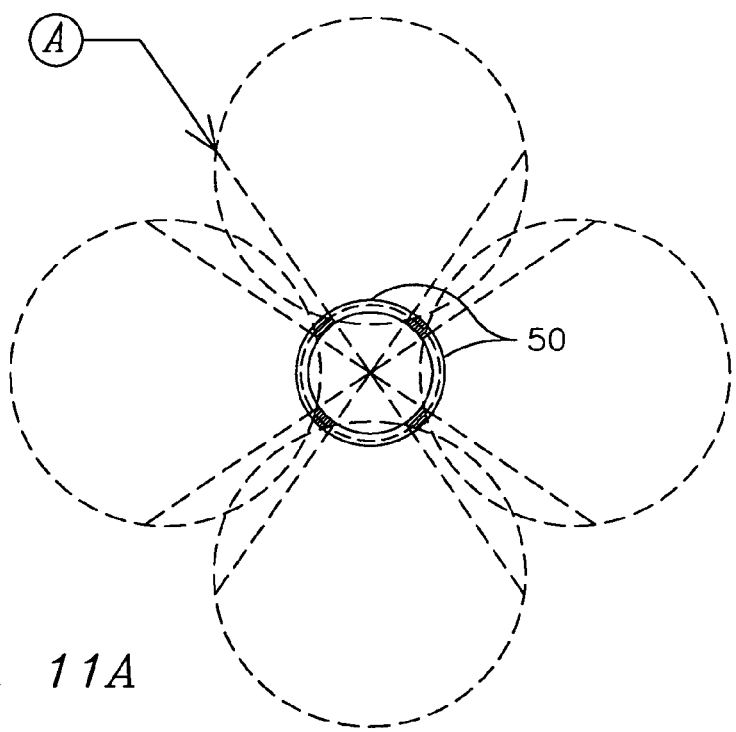

FIGS. 11 and 11a illustrate the cross-section and top plan view, respectively of the perforating filtering tube.

"A FILTERING DEVICE FOR A CITRUS JUICE EXTRACTION MACHINE", composed by two rods (41) passing through the machine's structure (42), and the sliding mobile peeler support (43). Said rods contain pins (44) which condition their return concurrently with the support (43) after the pressing of the fruit.

A base (45) is affixed to the two rods (41) in a manner such that the configuration facilitates the disassembly for cleaning purposes; on this base there is inserted a bolt (46) which mounts the extension (47) to the piston (48) (which need not have a same diameter relief at the center) which works concentric to the perforating tube (49) which in turn is concentric to the fixed peeler, mounted on the machine.

The piston (48) contains a cutting edge which projects itself out of the tube (49) at the end of the opening cycle of the peelers, so that it totally cleans the interior of this tube which contains a plurality transverse slits (50) which have increasing diameters from inside to outside, in a manner to facilitate the self cleaning.

The tube (49) is mounted to a round base (51) threaded to the tubular juice collector (52) which has a flange on which the static peeler is bolted to. Said collector and the peeler form a chamber (53) which collects the juice extracted from the fruit and filtered by the slits (50).

On the posterior position (outside of the machine) the collector (52) has a transverse slit (54) through which the totally filtered juice exits. The refuse materials (seed, core, etc.) pushed by the piston (48) fall inside the machine into a dedicated container.

It is worth noting that the constructive characteristics, allied to the utilization of stainless steel materials do not offer any alterations to the organoleptic characteristics of the fruit juice.

SUMMARY

Patent of invention "A FILTERING DEVICE FOR A CITRUS JUICE EXTRACTION MACHINE", developed for an equipment of the same claimant, being that its improvements are composed of two rods (41) passing through the machine's structure (42), and the sliding mobile peeler support (43) having pins (44) which condition the return of these rods to the support (43) being these rods fixed to a base (45) to which there is inserted a bolt (46) fixing the extension (47) to the piston (48) which contains a cutting edge and is concentric to the perforating tube (49) having multiple transverse slits (50) which is mounted to a round base (51) threaded to the tubular juice collector (52) which has a flange on which the static peeler is bolted on to so as to form the chamber (53) which collects the juice, which in turn exits through slit (54).

A descriptive report of a patent of and industrial model:

"CONFIGURATION OF A PERFORATING FILTERING TUBE FOR THE EXTRACTION OF FRUIT JUICE".

The patent referred to here as "CONFIGURATION OF A PERFORATING FILTERING TUBE FOR THE EXTRACTION OF FRUIT JUICE", fabricated in stainless steel material or the like, an accessory utilized on the equipment described in process "PI 950244-9" of Jun. 19, 1995, of the same claimant, and which is repeated herein above, which is designed for cutting and perforating of fruit and filtering of the juice extracted, such as: lemon, orange, tangerine, pokan, etc., for the extraction of their juice, with greater quality, practicality and hygiene, thanks to the configuration of the artifact.

The object consists of a tubular part having multiple symmetrical slits, trochoidal and parallel to each other, through which the extracted fruit juice exits, being said part installed on the pressing assembly of the machine.

Said object makes a central cut on the fruit through which the juice exits to be filtered by the aforementioned self cleaning slits, thanks to their configuration.

It is worth noting that the object in question presents singular details in comparison to the state of the technology, encompassing therefore the conditions to achieve the privilege sought.

Figure 12:
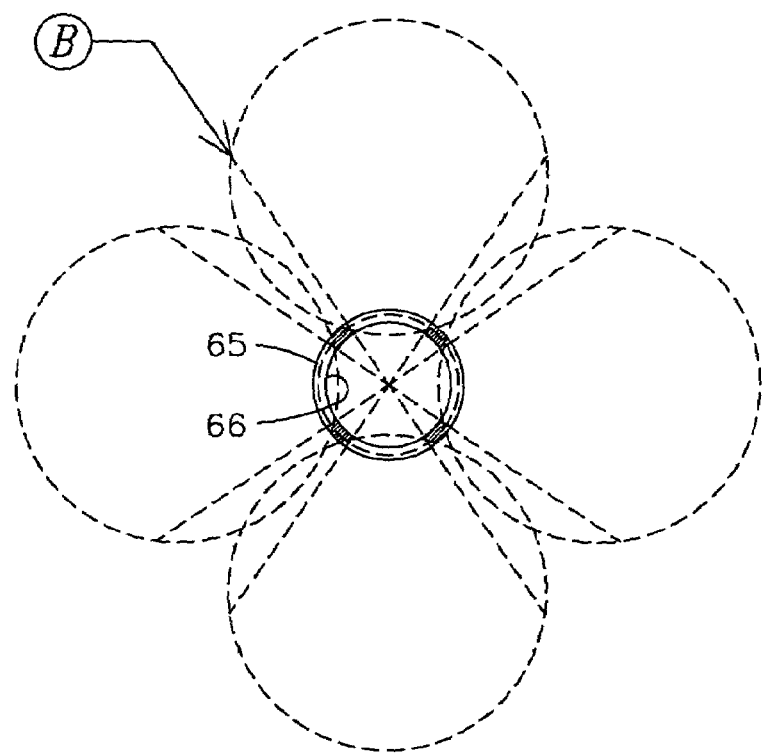
FIGS. 12 and 12A show the tube in a cross-sectional view and a side view.
Figure 12A:
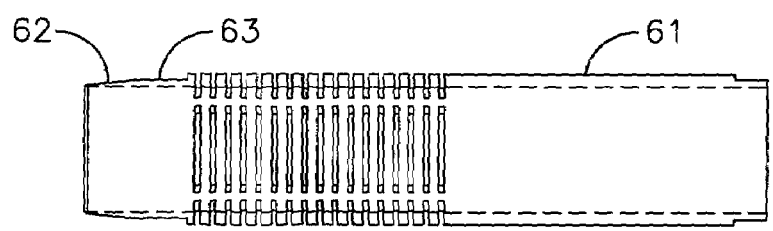

To better comprehend the model, references will be made to the following included drawings, where:

FIG. 12 shows the tube in a cross-sectional view and FIG. 12a shows the tube in a side view.

Figure 13:
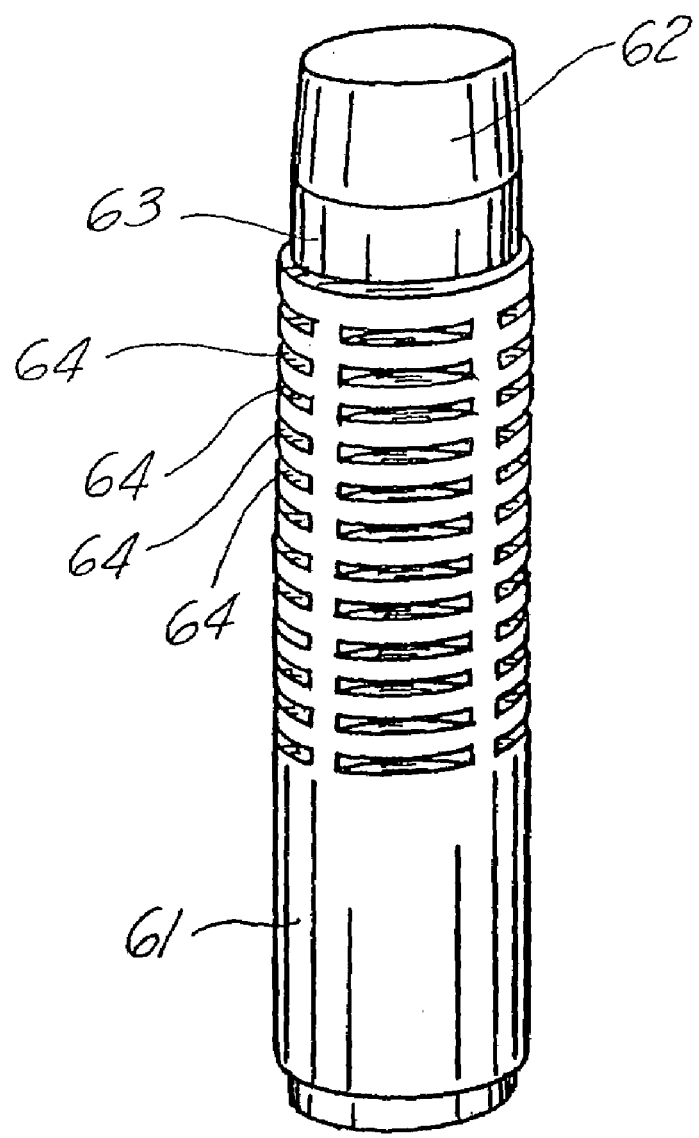
FIG. 13 shows the tube in perspective.

FIG. 13 shows the tube perspective.

"CONFIGURATION OF A PERFORATING FILTERING TUBE FOR THE EXTRACTION OF FRUIT JUICE", composed of a body (61) of stainless steel material or other materials resistant to oxidation and adapted to this purpose, having a circular shape.

Its extremity (62) is sharpened in order to perforate the fruit, followed by a straight portion (63). The body (61) has a plurality of transverse slits (64), configured strategically through the machining by a circular mill, forming an external diameter (65) which is larger than the internal diameter (66), which in turn impedes the retention of filtered residues.

SUMMARY

"IMPROVEMENT TO A FILTERING DEVICE FOR A CITRUS JUICE EXTRACTION MACHINE", characterized by a perforating tube (21) having multiple transverse slits (22) of increasing diameter from inside to outside, concentric to the peeler (23), and the tubular juice collector (25), that has a window opening (112) and a threaded cover (26), which centers the tube (21), being built-in a tubular extension (27) on which slides a rod (28) connected to the piston (29) pushed by the spring (110) being that the cutting extremity of the piston extends outward of the tube (21); a chamber (111) collects the juice filtered through the slits (12).

"A FILTERING DEVICE FOR A CITRUS JUICE EXTRACTION MACHINE", characterized by the fact that two rods (41) passing through the machine's structure (42), and the sliding mobile peeler support (43) having pins (44) which in turn are fixed to a base (45) to which there is inserted a bolt (46) fixing the extension (47) to the piston (48) which contains a cutting edge and is concentric to the perforating tube (49) having multiple transverse slits (50) which is mounted to a round base (51) threaded to the tubular juice collector (52) which has a flange on which the static peeler is bolted on to so as to form the chamber (53) which collects the juice, which in turn exits through slit (54).

"A FILTERING DEVICE FOR A CITRUS JUICE EXTRACTION MACHINE," characterized by the fact that the cutting edge of the piston (48) protrudes out of the tube (49) on it return course, being slits (50) of this tube of an increasing diameter from inside to outside of the tube.

A descriptive report of a patent of a model of utility:

"CONFIGURATION OF A CONCAVE AND RADIALLY CUT HEMISPHERE FOR THE CUTTING AND PRESSING OF FRUIT FOR THE EXTRACTION OF JUICE".

The patent referred to here as, "CONFIGURATION OF A CONCAVE AND RADIALLY CUT HEMISPHERE FOR THE CUTTING AND PRESSING OF FRUIT FOR THE EXTRACTION OF JUICE", fabricated in stainless steel or the like, as an accessory to the equipment of the same claimant, which is designed for the cutting and pressing of fruits such as: lemon, orange, tangerine, pokan, etc., for the extraction of their juices, with greater quality, practicality and sanitary conditions, thanks to the configuration of the artifact.

The object, functionally speaking, has a slimmer profile, which reduces the complexity of the assembly and its capacity to retain residues, being that, it consists of two parts, symmetrical and with divergent openings with concave cavities turned toward each other, having radially openings that permit the engaging of one part with the other.

It is worth noting that the present object presents singular details in comparison to the state of the technology, incorporating the conditions for achieving the privilege claimed.

Figure 14:
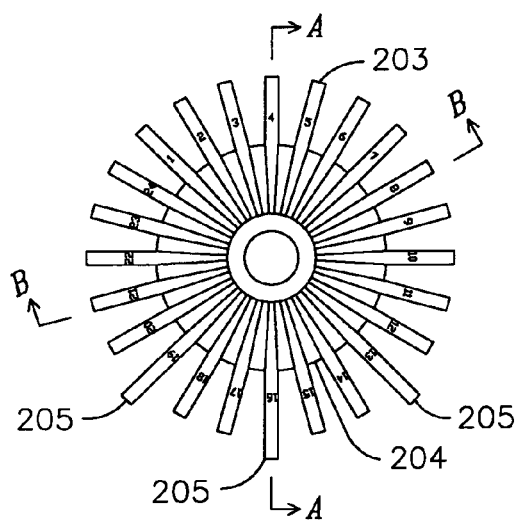
FIG. 14 shows in a plan view, the external shape of one of the radially cut and concave hemispheres.

For better comprehension of the model, references will be made to the following included drawings:

FIG. 14 shows in a plan, the external shape of one of the radially cut and concave hemispheres.

Figure 15:
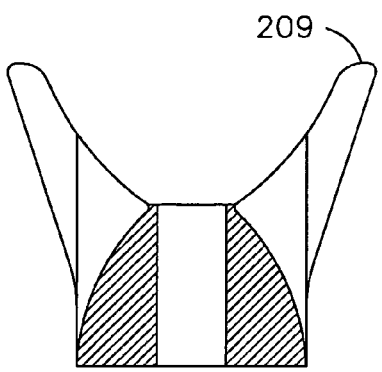
FIG. 15 shows a cross-section of the internal part of one of the radially cut and concave hemispheres along cut B—B of FIG. 14.

FIG. 15 shows a cross section of the internal part of one of the radially cut and concave hemispheres.

Figure 16:
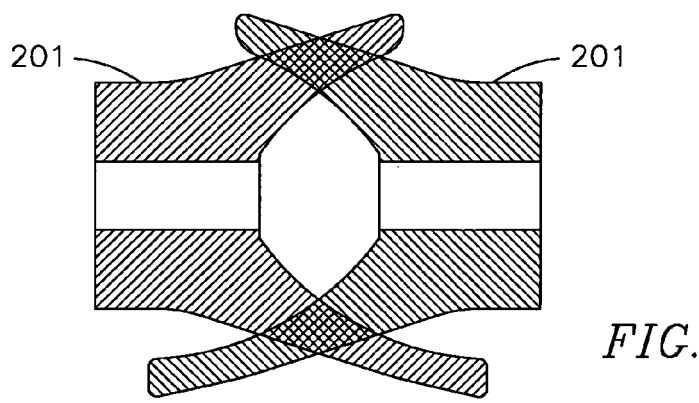
FIG. 16 shows the two radially cut and concave hemispheres in the operating position.

FIG. 16 shows the two radially cut and concave hemispheres in the operating position.

Figure 17:
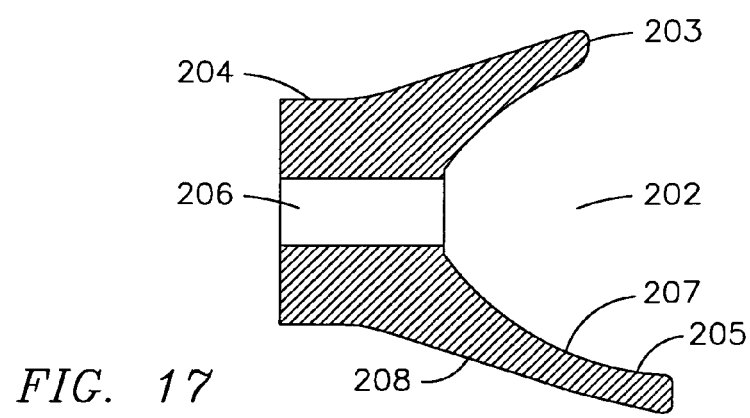
FIG. 17 shows a cross-section along cut A—A of FIG. 14.

FIGS. 15 and 17 illustrate cut B—B and a cut A—A of FIG. 14.

"CONFIGURATION OF A CONCAVE AND RADIALLY CUT HEMISPHERE FOR THE CUTTING AND PRESSING OF FRUIT FOR THE EXTRACTION OF JUICE", consists of a body (1) of metallic or other materials, having a divergent opening.

Internally, the body (201) has a concave shape (202), being said body (201) configured by a multiplicity of radial blades (203) that emerge from a solid block (204). The longer blades (205) mesh with the other blades of normal size, in a manner as to serve as support for the fruit.

Concentrically the body (201) contains a concentric hole (206); the blades (203) have an internal radius (207) smaller than the smallest external radius (8), being its extremities (209), slightly rounded (209).

What is claimed as invention is:

1. A fruit juice extraction apparatus for extracting juice from articles of fruit by pressing the fruit through a filter to pass the liquid juice to a reservoir having outlet ports therein and depositing the solid residue in a receptacle therefor, said apparatus comprising:

a chassis having mounted thereon juice extraction means;

said juice extraction means having means for storing said fruit, said storing means having an aperture therein for allowing articles of said fruit to be deposited between two concave hemispheres;

drive means for actuating means for forcing the first of said concave hemispheres against the second of said concave hemispheres, thereby pressing an article of said fruit deposited between said hemispheres;

said first concave hemisphere having a central pin and said second concave hemisphere a perforating tube for the extraction of juice from said article of fruit, whereby said solid residue is deposited in said receptacle and said liquid juice is passed through said filter and then falls into said reservoir which has said outlet ports therein; said perforating tube having multiple transverse slits of increasing diameter from inside to outside.

2. A fruit juice extraction apparatus for extracting juice from articles of fruit by pressing the fruit through a filter to pass the liquid juice to a reservoir having outlet ports therein and depositing the solid residue in a receptacle therefor, said apparatus comprising:

a chassis having mounted thereon juice extraction means;

said juice extraction means having a container for storing said fruit, said container having an aperture therein for allowing articles of said fruit to be deposited between two concave hemispheres;

a motor for actuating means for forcing the first of said concave hemispheres against the second of said concave hemispheres, thereby pressing an article of said fruit deposited between said hemispheres;

said first concave hemisphere having a central pin and said second concave hemisphere a perforating tube for the extraction of juice from said article of fruit, whereby said solid residue is deposited in said receptacle and said liquid juice is passed through said filter and then falls into said reservoir which has said outlet ports therein; said perforating tube having multiple transverse slits of increasing diameter from inside to outside.

3. A fruit juice extraction apparatus for extracting juice from articles of fruit by pressing the fruit through a filter to pass the liquid juice to a reservoir having outlet ports therein and depositing the solid residue in a receptacle therefor, said apparatus comprising:

a chassis having mounted thereon juice extraction means;

said juice extraction means having a container for storing said fruit, said container having an aperture therein and means for releasing an article of said fruit for allowing said article of said fruit to be deposited between two concave hemispheres;

a motor for actuating means for forcing the first of said concave hemispheres against the second of said concave hemispheres, thereby pressing an article of said fruit deposited between said hemispheres;

said first concave hemisphere having a central pin and said second concave hemisphere a perforating tube for the extraction of juice from said article of fruit, whereby said solid residue is deposited in said receptacle and said liquid juice is passed through said filter and then falls into said reservoir which has said outlet ports therein; said perforating tube having multiple transverse slits of increasing diameter from inside to outside, and, said filter having a curved body portion with a passageway of increasing width and terminating in a convergent liquid exit port; and, means for signaling the level of said solid residues accumulated in said receptacle.

4. A fruit juice extraction apparatus for extracting juice from articles of fruit by pressing the fruit through a filter to pass the liquid juice to a reservoir having outlet ports therein and depositing the solid residue in a receptacle therefor, said apparatus comprising:

a chassis having mounted thereon juice extraction means;

said juice extraction means having means for storing said fruit, said storing means having an aperture therein for allowing articles of said fruit to be deposited between two concave hemispheres;

drive means for actuating means for forcing the first of said concave hemispheres against the second of said concave hemispheres, thereby pressing an article of said fruit deposited between said hemispheres;

said first concave hemisphere having a central pin and said second concave hemisphere a perforating tube for the extraction of juice from said article of fruit, whereby said solid residue is deposited in said receptacle and said liquid juice is passed through said filter and then falls into said reservoir which has said outlet ports therein, each of said concave hemispheres having its concave surface defined by a plurality of spaced-apart radial blades, wherein said radial blades of each of said hemispheres are of at least two different lengths.

5. The apparatus of claim 4, wherein said radial blades of each of said hemispheres depend from a base mounted to said chassis.

6. The apparatus of claim 4, wherein when said first hemisphere is forced against said second hemisphere, said radial blades of said first hemisphere are positioned intermediate said radial blades of said second hemisphere.

* * * * *